(12) United States Patent
Jelezko et al.

(10) Patent No.: US 12,449,490 B2
(45) Date of Patent: Oct. 21, 2025

(54) DETECTOR ARRAY SYSTEM

(71) Applicants: YISSUM RESEARCH DEVELOPMENT COMPANY OF THE HEBREW UNIVERSITY OF JERUSALEM LTD., Jerusalem (IL); UNIVERSITY ULM, Ulm (DE)

(72) Inventors: Fedor Jelezko, Ulm (DE); Alex Retzker, Jerusalem (IL)

(73) Assignees: YISSUM RESEARCH DEVELOPMENT COMPANY OF THE HEBREW UNIVERSITY OF JERUSALEM LTD., Jerusalem (IL); UNIVERSITY ULM, Ulm (DE)

( * ) Notice: Subject to any disclaimer, the term of this patent is extended or adjusted under 35 U.S.C. 154(b) by 280 days.

(21) Appl. No.: 18/248,633

(22) PCT Filed: Oct. 11, 2021

(86) PCT No.: PCT/IL2021/051216
§ 371 (c)(1),
(2) Date: Apr. 11, 2023

(87) PCT Pub. No.: WO2022/079713
PCT Pub. Date: Apr. 21, 2022

(65) Prior Publication Data
US 2023/0384400 A1    Nov. 30, 2023

Related U.S. Application Data

(60) Provisional application No. 63/090,988, filed on Oct. 13, 2020.

(51) Int. Cl.
G01V 3/00 (2006.01)
G01R 33/032 (2006.01)
G01R 33/26 (2006.01)

(52) U.S. Cl.
CPC ........... *G01R 33/032* (2013.01); *G01R 33/26* (2013.01)

(58) Field of Classification Search
CPC .............................. G01R 33/032; G01R 33/26
(Continued)

(56) References Cited

U.S. PATENT DOCUMENTS 10,535,518 B1 * 1/2020 Kim .................... H01L 21/0242
10,571,498 B2   2/2020 Chipaux et al.
2020/0057117 A1 2/2020 Nishibayashi et al.

FOREIGN PATENT DOCUMENTS

CN      1233323 A  * 10/1999  ................ G01J 1/44
CN    104154297 A  * 11/2014  ......... F16K 31/0675
(Continued)

OTHER PUBLICATIONS

KR 20180112833 A (Offek) (Year: 2018).*
(Continued)

*Primary Examiner* — Walter L Lindsay, Jr.
*Assistant Examiner* — Frederick Wenderoth
(74) *Attorney, Agent, or Firm* — FisherBroyles, LLP; Roger L. Browdy; James E. Mrose

(57) ABSTRACT

A sensor system is presented comprising: a plurality of sensor units arranged in a predetermined arrangement to be exposed to an electromagnetic signal to be measured, a drive unit configured for providing one or more electromagnetic drive pulses to said sensing units to thereby affect one or more selected quantum properties associated with said plurality of sensor units, and an optical detector unit configured for detecting variation in one or more optical properties of the sensor units in response to input collected electromagnetic radiation; wherein said drive unit is configured to apply the electromagnetic drive pulses having a predetermined phase function on said plurality of sensor units.

20 Claims, 8 Drawing Sheets

(58) Field of Classification Search
USPC .......................................................... 324/304
See application file for complete search history.

(56) References Cited

FOREIGN PATENT DOCUMENTS

| CN | 107727742 A | * | 2/2018 | ............ G01N 29/06 |
| DE | 102017206279 A1 | * | 10/2018 | |
| WO | 2018052497 A1 | | 3/2018 | |

OTHER PUBLICATIONS

A. Stark et al., "Narrow-bandwidth sensing of high-frequency fields with continuous dynamical decoupling", Nat Commun 8, 1105 (2017).

Simon Schmitt et al., "Submillihertz magnetic spectroscopy performed with a nanoscale quantum sensor", Science vol. 356, No. 6340, May 26, 2017, pp. 832-837, XP55505675AI.

Ken Yahata et al., "Demonstration of vector magnetic field sensing by simultaneous control of nitrogen-vacancy centers in diamond using multi-frequency microwave pulses", arxiv.org, Cornell University Library, 201 Olin Library Cornell University Ithaca, NY 14853, Nov. 8, 2018, XP81047542AI.

\* cited by examiner

DETECTOR ARRAY SYSTEM

TECHNOLOGICAL FIELD

The present invention is in the field of detector systems for detection of RF radiation.

BACKGROUND ART

References considered to be relevant as background to the presently disclosed subject matter are listed below:
- Stark, A., Aharon, N., Unden, T. et al. Narrow-bandwidth sensing of high-frequency fields with continuous dynamical decoupling. *Nat Commun* 8, 1105 (2017). https://doi.org/10.1038/s41467-017-01159-2
- Schmitt, S., Gefen, T., Stürner, F. M., et al. Submillihertz magnetic spectroscopy performed with a nanoscale quantum sensor. *Science,* 356, 6340, pp. 832-837 (2017). http://science.sciencemag.org/content/356/6340/832

Acknowledgement of the above references herein is not to be inferred as meaning that these are in any way relevant to the patentability of the presently disclosed subject matter.

BACKGROUND

Detection of RF electromagnetic radiation is an essential element in modern day communication. The conventional detection technique utilizes interaction between electromagnetic radiation and electrons in conducting (or semiconducting) materials. This detection technique is based on classical understanding of the electromagnetic fields and, accordingly, allows detection of relatively strong electromagnetic signals.

Quantum interactions of photons with selected material properties enable detection of signal photon radiations and may enable detection of various properties of such photons.

U.S. Pat. No. 10,571,498 describes a system for analyzing a microwave-frequency signal by imaging, comprising: a solid material at least one optical property of which is modifiable in at least one zone of the material, when the zone is simultaneously in the presence of an optical excitation or electrical excitation and a microwave-frequency signal having at least one frequency coinciding with a resonant frequency of the material, the material furthermore being such that a value of the resonant frequency varies as a function of the amplitude of a magnetic field, a magnetic field generator configured to generate a magnetic field having, in the interior of a portion of the zone, a spatial amplitude variation in a direction X, the material then having a resonant frequency that is dependent on a position in the direction X, and a detector configured to receive an image of the zone in said direction X.

WO 2018/052497 describes a synchronized readout (SR) technique for spectrally selective detection of oscillating magnetic fields with sub-millihertz resolution, using coherent manipulation of solid-state spins.

GENERAL DESCRIPTION

There is a need in the art for a novel technique enabling high sensitivity detection, of electromagnetic radiation, in particular high frequency AC magnetic field (e.g. frequency higher than 10 MHz), while providing at least one of phase and frequency variation data.

The present disclosure relates to a quantum based detecting technique capable of detecting RF radiation with extremely high sensitivity and provide phase indication of the collected RF radiation. More specifically, the technique of the present disclosure provides phase-sensitive technique for detection of magnetic field to which a sensing system is exposed, based on quantum interaction between electromagnetic radiation and one or more quantum properties of selected materials to provide data indicative of collected electromagnetic radiation, that is capable of identifying single photon radiation intensity. Further, the present technique utilizes a plurality of detection centers, arranged in a predetermined arrangement, enabling detection of electromagnetic signals and determine data on spatial phase variation. This further allows determining the origin of the source of the electromagnetic signal.

Such detection technique can advantageously be used in various applications, including medical devices and communication systems, and is particularly useful in a radio receiver or in a radar receiver.

Generally, the detection technique is based on utilizing a multi-level quantum system (at least two levels) acting as a sensor. According to some embodiments, the present invention utilizes an arrangement of one or more, generally a plurality, of isolated quantum systems selected to interact with photons of the selected frequency range as sensing units. For example, the sensing units of the present technique may be formed of defects in solid state materials such as silicon, silicon carbide, carbides, metal oxides rare-earth crystals or others; in some embodiments the sensor units are formed of one or more nitrogen vacancies (NV) in selected crystal structure (e.g. diamond).

The sensing system of the present invention includes a signal receiving array formed of a plurality of sensing units, which are configured and operable as a phased array. The array of such sensing units is associated with an optical readout arrangement configured to periodically read the state (optical properties) of each sensing unit, and an electromagnetic (RF/microwave) drive unit(s) manipulating the sensing units by driving signals using a predetermined (known) phase function. The latter provides known phase relationship between the phases of the multiple driving signals at the locations of the sensing units. The phases of the driving signals at each manipulation session may be the same or different (but with known relation between them) resulting in the known phase relation or phase function of the driving signals at the locations of the sensing units (defined by the path of driving signals to the sensing units' locations).

Generally, the detector system of the present technique is positioned within a homogeneous magnetic field B region. To this end, the system may comprise a magnetic field generator, e.g. magnet, coil arrangement etc. The magnetic field is typically used for providing energetic split between generally close quantum states of the sensing units and enables detection of external variation in magnetic field that may be associated with detection of photons. The detector system further comprises a drive unit configured for providing electromagnetic drive pulses, selected to manipulate quantum states of the defects to thereby place the sensor unit in selected quantum states for detection. After a selected collection time, the state of the sensor unit is read by detection of light emitted from the sensor unit, providing indication on detection of photons and data about phase of the detected photons.

For example, in some preferred embodiments, the sensor units may be formed of crystal platelets (e.g. diamond) having certain defects providing optically active color centers such as Nitrogen Vacancy (NV) centers or other optically active defects. The platelets may have size between 100 micrometers and 5 millimeters, or between 100 micrometers and 1 millimeter. The color centers (e.g. NV centers) provide spin moments that can be optically polarized and vary their spin state in response to interaction with detected photons.

According to some embodiments of the invention, the sensing units are driven by a series of driving electromagnetic pulses, selected to have frequency within a predetermined range around resonant frequency of transition between states of the defect in the sensing units. For example, the electromagnetic pulses may have frequency within a range of 10 MHz or 100 MHz around the resonant frequency of the color centers of the sensing units. The driving pulses are synchronized to determine phase of the detected electromagnetic field (photons). The present technique utilizes drive pulses having at least known phase applied onto the plurality of the sensing units. This is to enable comparison between phases of the detected photons by the different sensing units.

Thus, according to one broad aspect, the present invention provides a sensor system comprising: a plurality of sensor units arranged in a predetermined arrangement, a drive unit configured for providing one or more driving sessions, each including electromagnetic drive pulses to said sensing units to thereby affect one or more selected quantum properties associated with said plurality of sensor units, and an optical detection unit configured for detecting variation in one or more optical properties of the sensor units in response to input collected electromagnetic radiation; wherein said driving unit is configured to generate, in each driving session, the electromagnetic drive pulses applying a predetermined phase function on said plurality of sensor units.

Preferably, the sensor unit comprises a solid state spin system having spin state dependent optical properties.

According to some embodiments, the drive unit is configured for performing two or more driving sessions thus providing one or more sequences of drive pulses onto said plurality of sensor units, path of said one or more sequences of drive pulses being set to provide a predetermined temporal relation between said drive pulses applied onto said plurality of sensor units.

According to some embodiments, the one or more sequences of drive pulses comprise drive pulses separated by a selected time delay providing said sequence formed by two or more drive pulses within coherence time of the sensor unit.

According to some embodiments, the sequence of drive pulses provides sampling rate that may correspond to at least twice expected frequency of the signal to be measured.

According to some embodiments, the plurality of sensor units may comprise a plurality of color centers of one or more crystal structures.

In some embodiments, the color canters may comprise one or more of the following: nitrogen vacancy (NV), silicon vacancies, Di vacancies, oxygen vacancies.

Additionally, or alternatively, the crystal structure may comprise crystals selected from the following: diamond, silicon, silicon carbide, carbides, metal oxides rare-earth crystals.

According to some embodiments, the drive unit comprises at least a first electromagnetic drive source configured to periodically provide first electromagnetic drive pulse(s) of a first frequency range applied onto said plurality of sensor units. As mentioned above, the drive pulse(s) generate by such first electromagnetic drive source may be of a certain initial phase and its arrival to the multiple different locations of the multiple sensor units provides a corresponding phase relation/phase function of the drive signal applied to the sensor units.

The drive unit may further comprise a second electromagnetic drive source configured to periodically provide second electromagnetic drive pulse(s) of a second frequency range applied onto said plurality of sensor units.

According to some embodiments, the drive unit is configured to provide at least one electromagnetic drive pulse having uniform phase (i.e., equal for all units) and equal pulse time for all sensor units.

According to some embodiments, the drive unit is configured to provide the at least one electromagnetic drive pulse having linear phase variation at positions of said plurality of sensor units.

According to another broad aspect, the present invention provides a sensor system comprising:
(a) an array of two or more sensor units arranged in a predetermined order, each of said sensor units comprising a solid state spin system having spin state dependent optical properties;
(b) a drive unit configured to provide at least one electromagnetic drive pulse onto said two or more sensor units; and an illumination unit configured to periodically provide an illumination pulse onto said two or more sensor units; said drive unit and said illumination unit being configured to coherently manipulate spin states of said two or more sensor units;
(c) a detection unit comprising an arrangement of detector cells positioned and configured for collecting light output of said two or more sensor units and provide data indicative of spin state dependent optical properties of each of said two or more sensor units;
wherein, said drive unit is configured to apply said electromagnetic drive pulse onto said two or more sensor units while having known phase function of said electromagnetic drive pulse reaching each of said two or more sensor units.

According to some embodiments, the drive unit comprises at least a first electromagnetic drive source configured to periodically provide first electromagnetic drive pulse onto said two or more sensor units.

According to some embodiments, the drive unit may further comprise a second electromagnetic drive source configured to periodically provide a second electromagnetic drive pulse onto said two or more sensor units.

According to some embodiments, the drive unit may be configured to provide said at least one electromagnetic drive pulse having uniform phase in locations of said two or more sensor units.

According to some embodiments, the drive unit may be configured to provide said at least one electromagnetic drive pulse having linear phase variation in locations of said two or more sensor units.

According to some embodiments, the drive unit may be configured to provide one or more sequences of pulses within coherence time of the plurality of sensor units, said one or more sequences of pulses providing phase sampling of a signal to be detected, thereby enabling detection of phase and frequency data of collected signals.

According to yet another broad aspect of the invention, it provides a phased array system comprising: an array of two or more sensor units arranged in a predetermined order, each of said sensor units comprising a solid state spin system having spin state dependent optical properties; a drive unit configured to provide at least one electromagnetic drive pulse onto said two or more sensor units, said electromagnetic drive pulse being configured to apply a predetermined phase function on said two or more sensor units; and an illumination unit configured to periodically provide an illumination pulse onto said two or more sensor units, said drive unit and said illumination unit being configured to coherently manipulate spin states of said two or more sensor units; and a detection unit comprising an arrangement of detector cells positioned and configured for collecting light output of said two or more sensor units and provide data indicative of spin state dependent optical properties of each of said two or more sensor units.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which.

DETAILED DESCRIPTION OF EMBODIMENTS

As indicated above, the present invention provides a detector system for use in detection of electromagnetic radiation, specifically suitable for high frequency electromagnetic radiation such as microwave radiation.

Figure 1A:
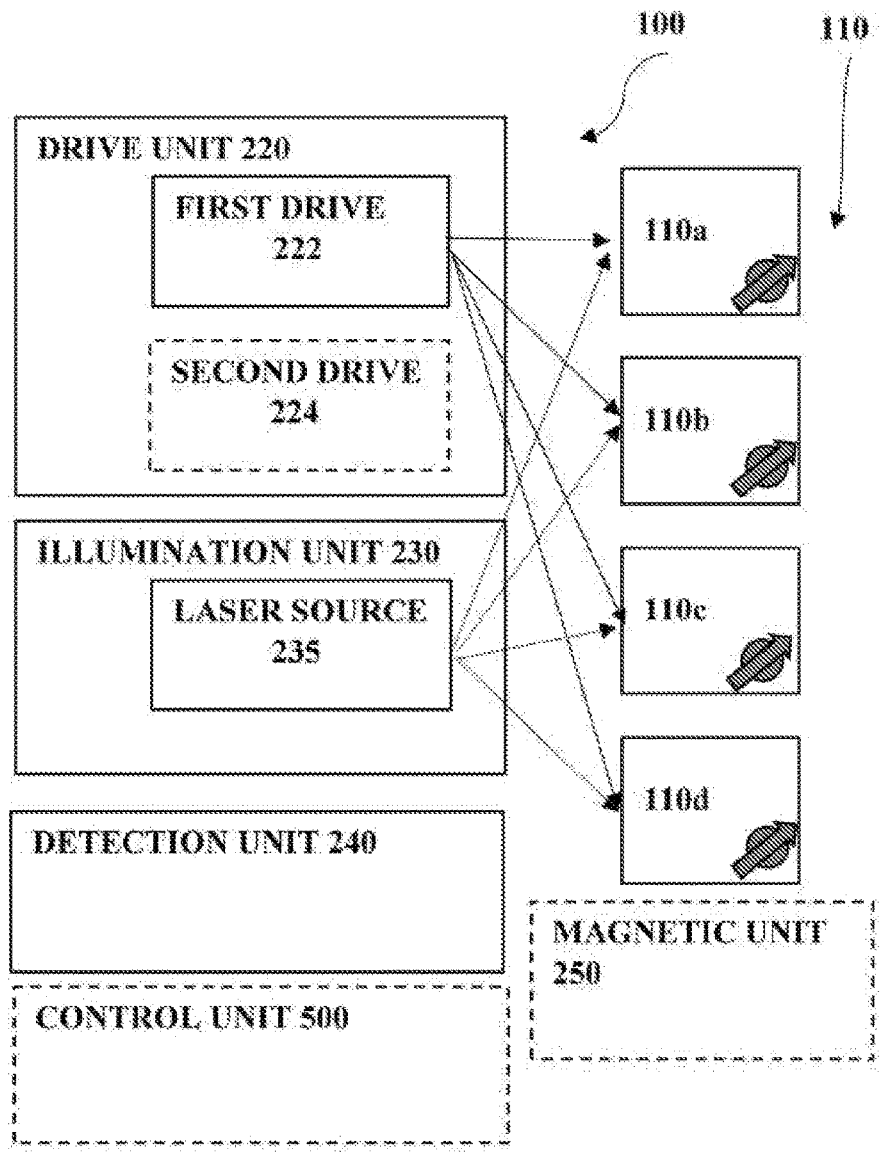
FIG. 1A illustrates schematically a sensor system according to some embodiments of the present invention.

Reference is made to FIG. 1A schematically illustrating the configuration and operation of a detector system 100. The system 100 includes an array of sensor units 110, exemplified by sensor units 110a to 110d. The sensor units are arranged in a predetermined array for collecting electromagnetic radiation to provide indication of wavefront spatial structure. The system 100 further includes a drive unit 220, an illumination unit 230, a detection unit 240, and may include a magnetic unit 250. In some embodiments, the system 100 may also be associated with a control unit 500 configured and operable for generating operational commands for operating the system 100 and for receiving and transmitting or presenting data about collected/detected radiation. The illumination unit 230 may include a laser light source 235 providing selected laser illumination enabling to read out the state of the sensor units.

The sensor units are typically formed of a quantum system having two or more states (e.g. spin states). For example, the sensor units may be formed by solid-state material having one or more defects generating a separated quantum system. More specifically, the solid crystals of the sensor units may include one defect in the crystals or a plurality of defects (many defects) in each crystal. Generally, the defects may act as color centers in the material. In some configurations, the defects may be in the form of nitrogen vacancy (NV) canters in solid state structure, or silicon vacancies, Di vacancies, oxygen vacancies or other color centers. For example, the sensor units 110a-110d may be formed of diamond material having one or many NV centers.

The drive unit 220 is configured to provide one or more external drive perturbations, applied onto the array 110 of the sensor units, to establish the sensor unit in quantum state suitable for detection. The drive unit 220 may include a first drive 222 generator and may further include a second drive 224 generator configured to provide respectively first drive pulses and second drive pulses formed by electromagnetic radiation of a selected frequency applied on the sensor units 110a-110d. The drive pulses are timed (i.e. arranged with a certain time pattern) to enable retrieving data on phase of photons collected by the sensor units 110a-110d. Additionally, path of the drive pulses between the drive unit 220 (or antenna thereof) and the locations of the sensor units 110a-110d in the array is set such that phase of the drive pulses reaching each of the sensor units 110a-110d is known (predetermined), and preferably have simple relation (phase function) between the sensor units 110a-110d.

In other words, the drive unit is configured to apply the electromagnetic drive pulses applying a predetermined phase function on the plurality of sensor units. This enables retrieval of a phase relation between different photons detected by the different sensor units 110a-110d and thus allows for determining data about wavefront of signals collected by the sensor array.

The configuration and operation of the illumination unit 230 and detection unit 240 enables reading of signal collection from the sensor units 110a-110d. To this end, the illumination unit 230 provides laser illumination of selected wavelength range directed onto the sensor units 110a-110d. The detector unit 240 is configured to detect variation of light response of the sensor units to the illumination, e.g. variation in fluorescence emission or in absorption of light by the sensor units 110a-110d. This variation of the light response is indicative of photons collected by one or more of the sensor units 110a-110d, enabling to detect low intensity electromagnetic signal.

Although FIG. 1A exemplifies an array of four sensor unit 110a-110d, it should be understood that the system and technique of the present invention are not limited to the number of sensor units. Generally, the array of sensor units 110 may include a selected number of two or more sensor units.

As indicated above, the sensor unit 110 may typically be formed of solid-state structure (e.g. crystal structure) having one or more selected defects. Such defects may for example include nitrogen cavity centers. The defects effectively provide a quantum system having discrete set of states, thus allowing to monitor interaction of the quantum state of the defects with external fields, and specifically external magnetic field.

Readout of photon(s) collected by the different sensor units may generally be independent of that of the other sensor unit(s) of the array 110. However, such independent readout may typically provide noisy data and is limited in construction of spatial structure of electromagnetic radiation. This is since the spatial structure of radiation is generally associated with spatial phase relations between electromagnetic fields, or with phase relations between photons collected at different locations. To this end, the present technique utilizes drive unit 220 configured to provide drive pulses having initial phase relation such that the drive pulses apply a certain known phase function, i.e. having known/predetermined phase relation, on the different sensor units 110a-110d (different locations).

Further, the system may be configured such that the drive unit 2260 provides, in each drive session, substantially equal optical paths to the drive pulses emitted from the drive unit 220 until interacting with the defects within the sensor units 110a-110d. This is based on the inventors' understanding that a selected sequence of drive pulses enables detection of relative phase data from NV centers in diamond. Further in some embodiments, the sequence of drive pulses is selected allowing to determine frequency of the collected photons.

Figure 1B:
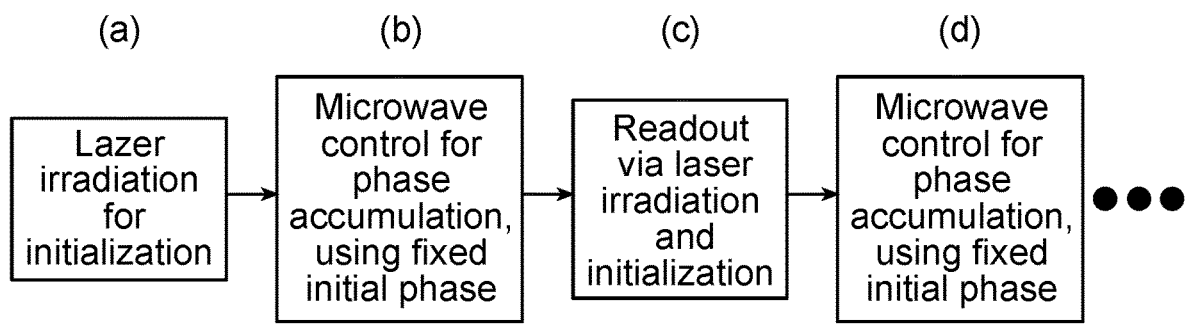
FIG. 1B exemplifies a flow chart of sequential steps of a method of the present invention used in the detection scheme for detecting magnetic signals of high frequency in a phase sensitive way.

FIG. 1B exemplifies a flow chart of sequential steps of a method of the detection scheme for detecting magnetic signals of high frequency in a phase sensitive way according to the technique of the present invention. The detection scheme utilizes an ensemble of NV centers in diamond or an ensemble of other defects in solid state materials, like silicon, silicon carbide, metals oxides, rare earth crystals and others. The method is performed using the system of the invention configured as described above.

The solid body, in particular, a diamond platelet or other material, could be of 100 micrometers, or a few hundreds of micrometers or a millimeter or more. The detection spin moments may be respectively configured as an electron spin moment of a color center, in particular of an NV center or other defects in solids. The detection spin moments can be polarized with laser light or by other methods. The electron spins moments are manipulated by a microwave source on resonant or nearly on resonant with the color centers or with the other defects. The state of the NV center is detected by the number of photons emitted from the NV center.

As shown in the figure, at stage (a), laser irradiation is applied and the color center is initialized in its ground state. Then, at stage (b), the color centers are driven at the resonant frequency or close to resonant frequency of each of the color centers, as will be described more specifically further below. The drive could be in a single drive setup, a double drive setup, higher drive setup or phase modulated setup. The initial phase of the drive is kept fixed in all the drives at this stage when it is repeated later on, and the time is recorded with high precision, thus defining the phase function of the drives applied to the multiple sensors. At stage (c), for each color center, the number of photons in the detected light response is recorded and the color center is initialized; this will also be described more specifically further below. In stage (d), the color centers are driven again with a fixed phase with respect to the previous drive. From the number of photons collected at each stage, the phase and the frequency could be efficiently estimated, as also will described more specifically further below.

Figure 2A:
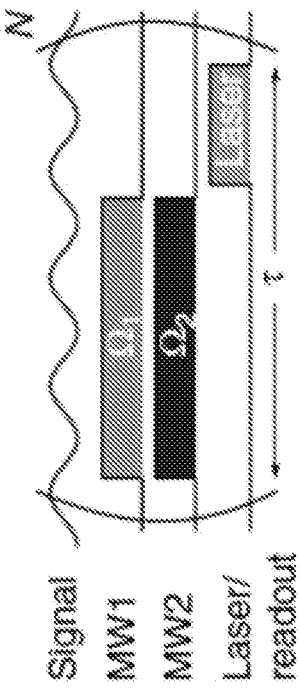
FIGS. 2A to 2C illustrating principles of operation of NV based detector according to some embodiments of the present invention.
Figure 2B:
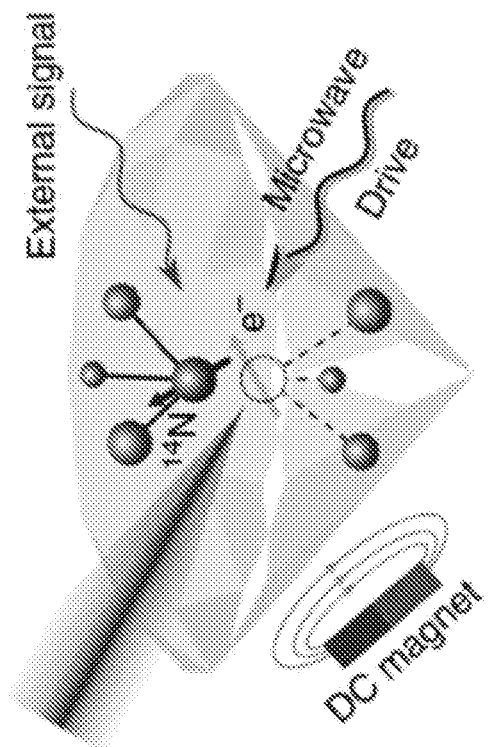
Figure 2C:
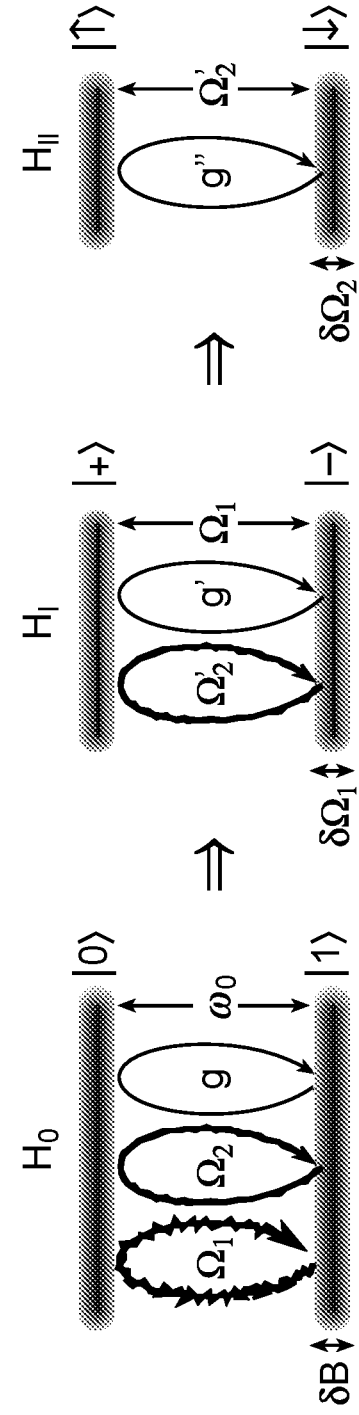

Reference is made to FIGS. 2A to 2C illustrating schematic representation of a quantum sensor unit suitable to be used in the system of the invention. In this example, the sensor unit is formed of an NV center in a diamond crystal.

In FIG. 2A The NV center probes an external signal while it is being manipulated by/subjected to control fields, DC magnetic field and microwave drive. FIG. 2B is a schematic representation of the sequence applied on the NV center. FIG. 2C shows transformation applied to a protected two-level system (TLS) starting with the bare system on the left, in which the Hamiltonian function/operator $H_0$ (defining the total energy of the system) is subjected to strong environmental noise $\delta B$. Applying a strong drive $\Omega_1$ opens a protected gap, leaving the system described by Hamiltonian $H_I$ subjected mainly to drive fluctuations $\delta\Omega_1$. After applying a second drive $\Omega_2$, on the rightmost image section, to protect the TLS, the system described by Hamiltonian $H_{II}$ is generally protected from the drive fluctuations, resulting in a TLS on resonance with a signal to be detected (where signal, g"=g'/2=g/4 in the double drive case). In this case, the noise affecting the system is mainly associated with fluctuations of the second drive $\delta\Omega_2$ being relatively weak with respect to fluctuations of the first drive $\delta\Omega_1$. This is because the second drive is weak in drive amplitude, leaving smaller fluctuation amplitude.

As exemplified in FIGS. 2A to 2C, the present technique may utilize first, second and higher number of drive pulses, e.g. provided by first and second drive units 222 and 224 in FIG. 1A. The drive pulses may generally be electromagnetic radiation pulses having frequency selected in accordance with energetic resonance of the two-level system of the array of sensor units 110. The first drive is generally stronger with respect to the second drive. Further, the first and second drive pulses are directed at different axes and preferably orthogonal, e.g. having different polarizations and/or directed at the sensor units 110 from different directions. Alternatively, the first and second drive pulses may be directed along the same axis but with different phase and/or frequency.

This Hamiltonian representation of the two-level system (for each sensor unit from the array 110) can be described as:

$$H = H_0 + H_{\Omega 1} + H_{\Omega 2} + H_s = \frac{\omega_0}{2}\sigma_z + \Omega 1 \sigma_x \cos(\omega_0 t) + \Omega 2 \sigma_y \cos(\omega_0 t)\cos(\Omega 1 t) + g\sigma_x \cos(\omega_s t + \varphi)$$

where $\omega_0$ is the energy gap of the TLS, $\omega_s$ is the frequency of the signal to be detected, g is the signal strength to be determined (in Rabi cycles, i.e. cyclic behavior of a two-level quantum system in the presence of an oscillatory driving field). The drive pulses may generally be configured to provide $\omega_s=\omega_0+\Omega 1+\Omega 2/2$ to optimize signal detection.

Using frame of reference based on the first and second drive pulses, and moving to dressed states representation enables to simplify the Hamiltonian of the TLS to:

$$H_{III} = \frac{g}{8}\left(\sigma_+ e^{-i\varphi} + \sigma_- e^{+i\varphi}\right)$$

Thus, the use of the first and second drives creates effectively doubly dressed states that are separated from power fluctuations, and enable accurate and high-sensitive detection of small signal g.

It should be noted that the drive pulse strength, as well as the signal strength, are used herein with respect to Rabi frequency (radian frequency of the Rabi cycle), where $\Omega_1$, $\Omega_2$ and g relate to pulse strength with respect to Rabi cycle or portion thereof.

Using the drive pulses, having predetermined parameters, $\Omega_1$ and $\Omega_2$, provides a concatenated drive and sensing sequence in which the illumination unit 230 is operated for providing a sensing signal in the form of illumination pulse applied onto the sensor unit 110. This enables detection of external high-frequency signal around one of the four appearing energy gaps $\omega_s$ of the doubly dressed states. The detection provide variation of absorption and/or fluorescence of the sensor unit.

The double drive scheme is compared to a standard single drive approach, in accordance with the smallest magnetic field that can be sensed after an accumulation time t. The smallest measurable signal S may generally be bounded by the smallest measurable magnetic field change $\delta B_{min}$, which is $$\delta B_{min}(t, \tau) = \frac{\delta S}{\max|\partial S/\partial B|} = \frac{1}{\gamma_{NV}} \frac{\sigma(t)}{\alpha \tau C}$$

Here, $\gamma_{NV}$ is the gyromagnetic ratio of the sensor defect (typically $\gamma_{NV}/2\pi=28.8$ GHz/T for NV of diamond), $\sigma(t)$ is the standard deviation of the measured normalized fluorescence counts after time t, $\alpha$ accounts for a different phase accumulation rate depending on the decoupling scheme, and C is the contrast of the signal.

Since the photon counting is shot noise limited, the standard deviation is taken as $\sigma(t)=1/(N_{ph}N)^{1/2}$, with $N_{ph}$ being the number of photons measured in $\tau$ and $N=t/\tau$ is the number of sequence repetitions.

Thus, the detection unit 240 is operated for determining $\sigma(t)$ as a function of time to determine data about the signal, and specifically the magnetic field component of the collected signal. Such measurements being implemented on a single sensor unit are exemplified in FIGS. 3A and 3B. It should, however, be understood, that according to the present invention the measurements are performed using phased array of sensor units (resulting from proper drive signals applied to the array of sensor units), and the full detection of the all the multiple components of the magnetic field is achieved.

Figure 3A:
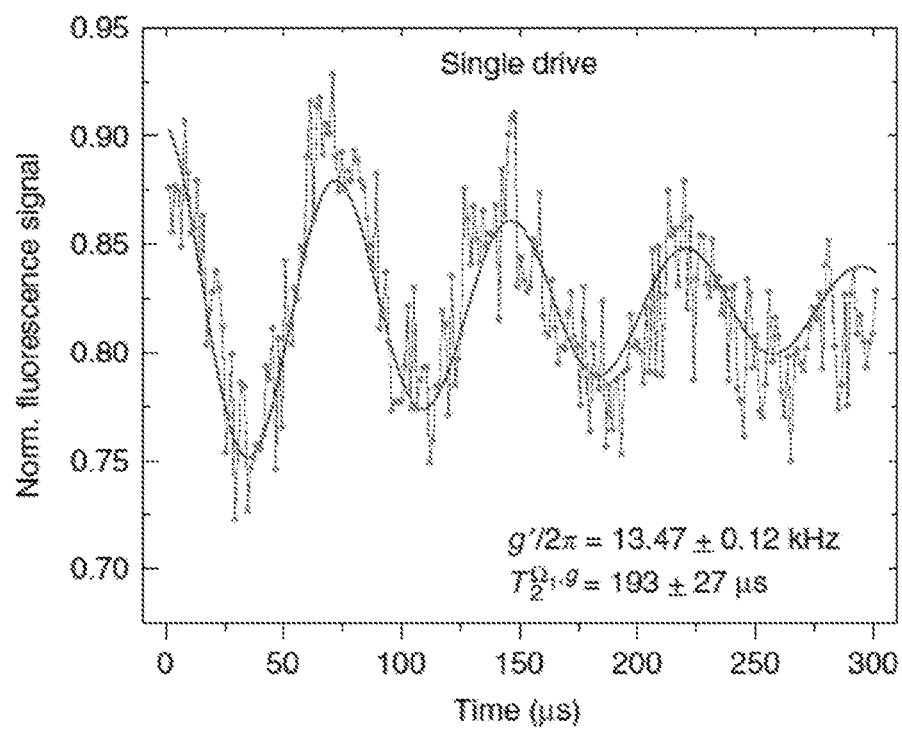
FIGS. 3A and 3B show, respectively, sensitivity measurements of sensor unit using respectively signal and double drive configurations according to some embodiments of the present invention.
Figure 3B:
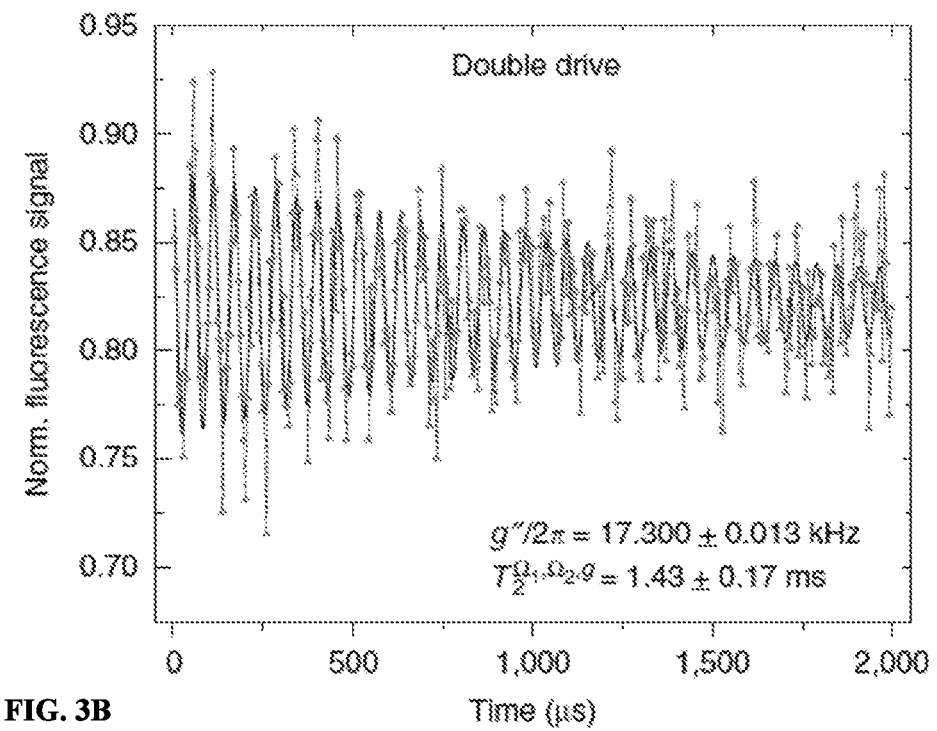

FIGS. 3A and 3B show measurements of an external signal of strength g using a single sensor unit according to some embodiments of the present technique. FIG. 3A shows measurement using a single drive approach with $\Omega_1/2\pi=3.002$ MHz, this approach provides recording of a signal g'=g/2. FIG. 3B shows measurement using first and second drive fields with $\Omega_1/2\pi=3.363$ MHz and $\Omega_2/2\pi=505$ kHz. In this example the signal recorded represents g"=g/4, also, the use of the first and second drive fields increases the coherence time of the sensor by one order of magnitude with respect to the case of g=0, i.e. the time allowing the sensor unit to wait for signal to be collected.

Thus, the use of concatenated first and second drive pulses enables detection of small magnetic fields, thereby detecting small signals. This is supported by the increased sensitivity to the signal field g illustrated in the Hamiltonian representation by $H_{III}$.

Figure 4:
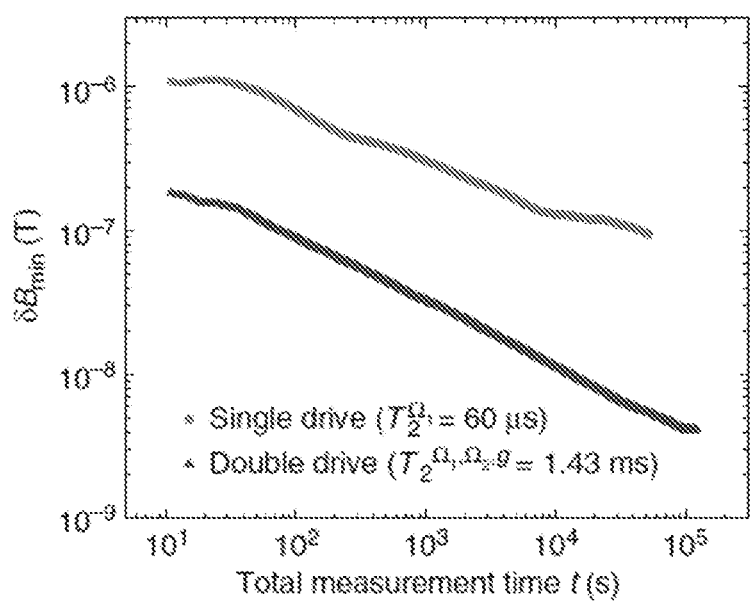
FIG. 4 shows comparison of magnetic field sensitivity of sensor unit using signal and double drive configurations.

Reference is made to FIG. 4 illustrating a comparison of the smallest measurable magnetic field changes $\delta B_{min}$ detectable by sensor units according to some embodiments of the present technique as a function of measurement time. The magnetic field is described by the measured signal as $\delta B_{min}=(2\pi\delta g_{min})/\gamma_{NV}$.

To show the total improvement in detection sensitivity, the sensor unit is operated for obtaining the time variation of the quantum state $\sigma(t)$ at $\tau=T_2^{\Omega 1}\approx 60$ µs in the case using single drive, and $\sigma(t)$ at $\tau=T_2^{\Omega 1;\Omega 2}\approx 1.43$ ms in the configuration using double drive. It should be noted that for both data traces a signal was always present, $g/2\pi=26.9$ kHz and $g/2\pi=69.2$ kHz in the single and in the double drive, respectively. As seen in FIG. 4, the double drive, using first and second drive pulses, prolongs the coherence time enabling improved measurement sensitivity. It should be noted that in the double drive configuration, the coherence time prolonging effect of g was included into the choice of $\tau$ for determining the magnetic field from the measured signal, i.e., the measurement was performed at $\tau=T_2^{\Omega 1;\Omega 2;g}$ instead of $\tau=T_2^{\Omega 1;\Omega 2}\approx 393$ µs.

As indicated herein, the present technique enables sensing of high frequency fields with prolonged coherence time of each of the sensor units. This enables sensing of very weak signals within a selected frequency range, e.g. microwave frequency, short wave RF etc. Further, as indicated above, the present technique provides substantially similar drive pulses, typically including first and second drive pulses, applied onto the array of sensor units 110. The use of properly tailored first and second drive pulses enables detection of magnetic field variation, and thus extraction of phase information of detected electromagnetic signal. To provide phase data from the plurality of sensor units of the array 110, the present technique utilizes drive pulses having known/predetermined phase relations between the locations of the sensor units, thus enabling to determine a relation between the signal portions detected by each of the sensor units for reconstruction of the signal wavefront. As indicated above, the known phase relation may generally be a flat phase front applied on the plurality of sensor units.

Additionally, the present technique utilizes quantum spectroscopy technique enabling detection with spectral resolution. In this configuration, the spectral resolution is independent of the sensor coherence time and an enhanced precision can be obtained, with scaling of $T^{-3/2}$. The spectroscopy technique may be viewed as analogous to classical heterodyne detection in that an unknown signal is "mixed" with a local oscillator. However, in this configuration, the nonlinear mixing element is a quantum coherent probe of the sensor units 110. This quantum heterodyne detection scheme retains critical elements of both conventional heterodyne detection and quantum sensing to form a hybrid quantum-classical device that may outperform each technique in isolation. It should however be noted that the sensor units 110 operated as described herein do not need the use of feedback to lock the sensor to the signal phase. Generally, the frequency resolution is defined by the oscillator stability, enabling the measurement linewidth to be narrowed beyond the T2 limit of the quantum sensor.

Let us analyze the interaction of a spin qubit with an oscillating magnetic field of the form $H(t)=k\sigma_z \sin(2\pi v t + \phi)$, where k is the interaction strength, $\sigma_z$ is the Pauli spin-z operator, and $\phi$ is an arbitrary phase of the magnetic field. Accumulation of a relative phase between two of the sensor's spin levels, denoted here $|0\rangle$, $|1\rangle$, after being brought into a coherent superposition state $1/\sqrt{2}(|0\rangle+|1\rangle)$ can be tailored to depend on the amplitude as well as frequency of the detected field. Further, accumulation of the relative phase between the states may also be associated with the signal phase with respect to a selected time point indicating start of the measurement. For example, when applying a series of $it$-pulses with time separation being close to $\frac{1}{2}v$, the sensor acquires a net phase $\Phi=2kT_s \cos(\phi)/\pi$, where $T_s$ is the interaction time. The present technique enables maintaining coherence of the signal throughout multiple measurements, so that the output state of the sensor depends on the signal phase φ. Additionally, control over the timing of subsequent measurement may be used to imprint changes in the signal phase onto the sensor. As a result, even though the sensor is reset after each measurement, correlations across measurements for times exceeding the sensor coherence time can be observed.

More specifically, the sensor phase $\Phi_n$ at each measurement time $T_n=nT_L$ is described by $\Phi_n=2kT_s/\pi \cdot \cos[2\pi\delta(T_n-T_L)+\varphi]$, where $T_L$ is the sum of the interaction time and the readout time, and $\delta=v-v_{LO}$, where $v_{LO}$ is a function of $T_L$ as described below.

Figure 5B:
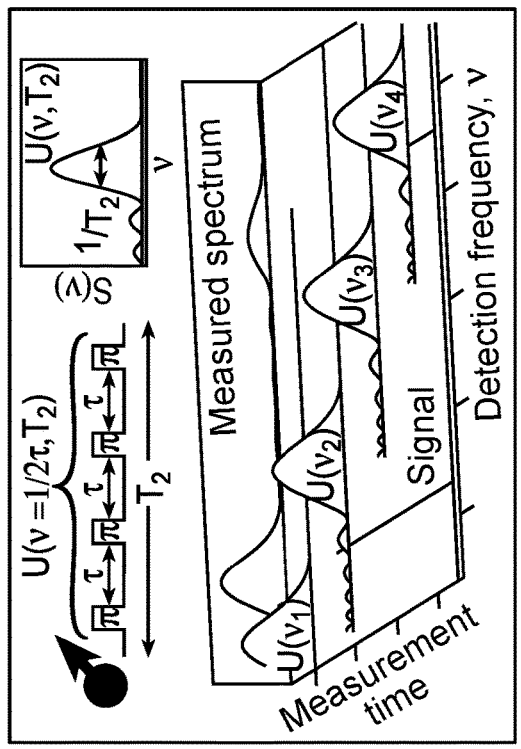
FIGS. 5A-C illustrate the use of pulse sequence for determining phase and frequency data of collected signal according to some embodiments of the present invention.
Figure 5C:
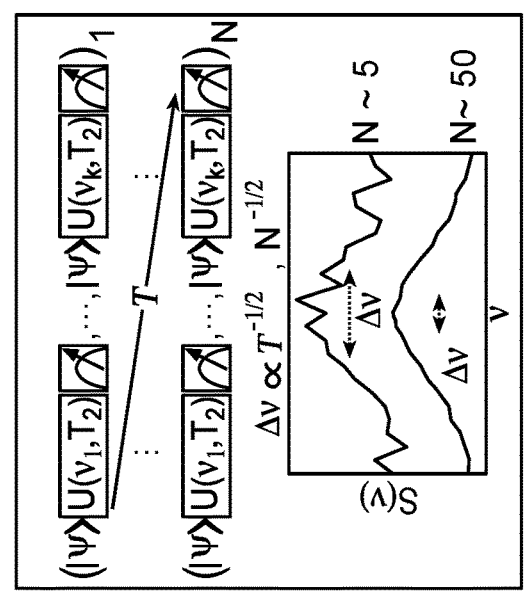
Figure 5A:
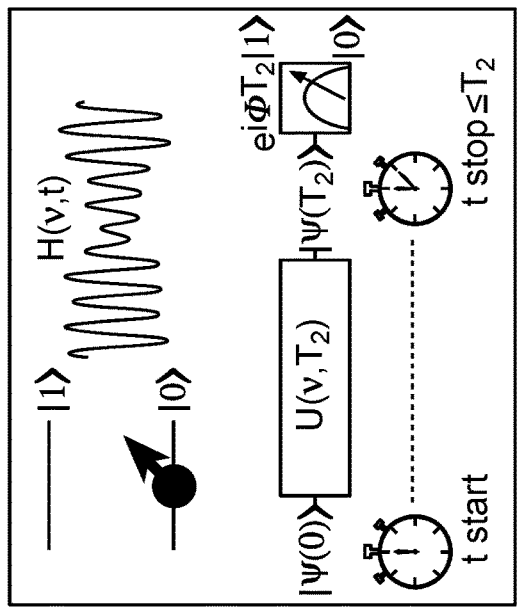

Accordingly, reference is made to FIGS. 5A-C exemplifying certain aspects of the present technique. As shown in FIG. 5A, the quantum sensor may be a spin qubit (e.g. a representation of spin states in NV center). The spin qubit may be used to measure frequency components of a time-varying Hamiltonian indicating the fields that act on the qubit. The measurable interaction period is generally limited by the qubit coherence time, after which the qubit state is read out.

FIG. 5B illustrates a quantum spectroscopy technique according to some embodiments of the present technique. The qubit is driven by a sequence of drive pulses having π pulse duration. A spectral filter is generated during the interaction period by pulsing or driving the sensing qubit. For the sequence (e.g. XY8 sequence), the filter is centered near frequency ½τ, where τ is the interpulse delay, and has a width inversely proportional to the interaction time. The filter is scanned stepwise during multiple measurements in order to acquire a complete spectrum of the signal. FIG. 5C shows a single interaction period at each detection frequency repeated multiple times to provide improved frequency estimate. The uncertainty in frequency precision usually scales as the square root of the number of measurements.

Figure 6:
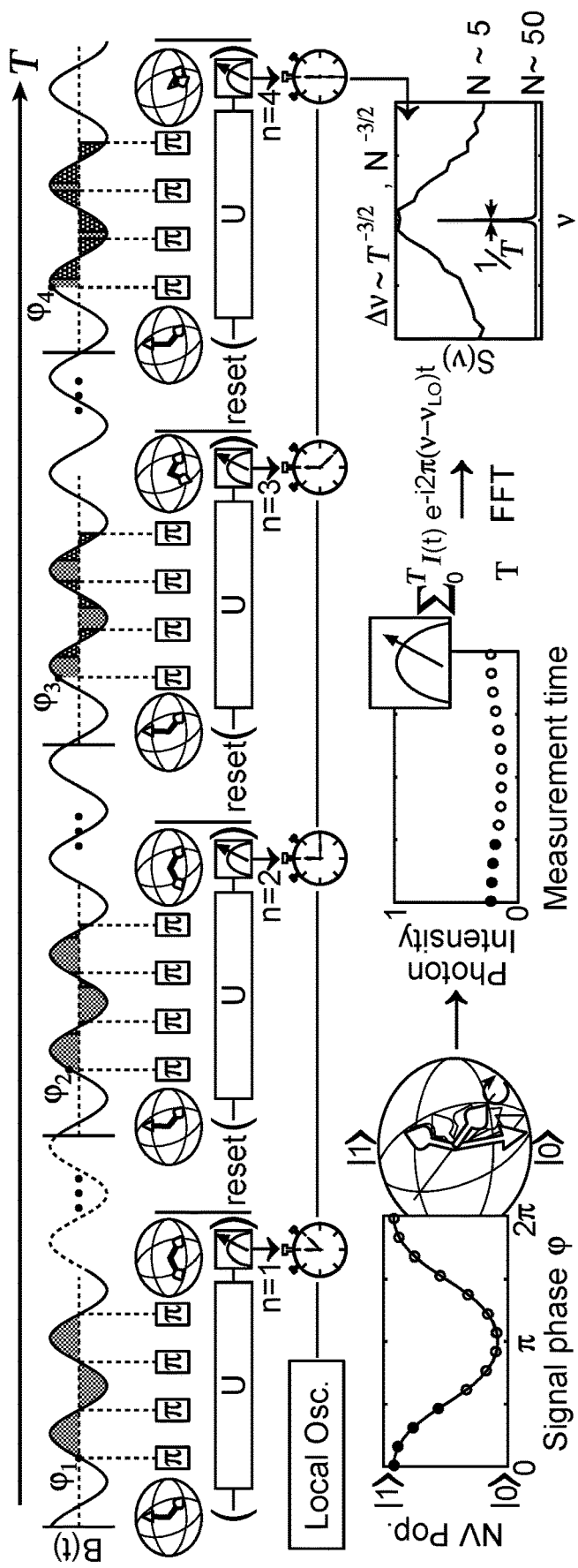
FIG. 6 illustrates reconstruction of signal waveform collected by a sensor unit according to some embodiments of the present invention.

Reference is made to FIG. 6 illustrating output state of the sensor unit. As shown, the output state depends on the initial phase $\varphi_1$ of the signal field. The measurement result is recorded and synchronized with an external clock before the next measurement is performed for a second signal phase $\varphi_2$, and additional measurements on signal with initial phases $\varphi_3$ and $\varphi_4$. By heterodyning with an external clock, the NV population and therefore the measured photon intensity records the signal phase evolution in time. Using Fourier representation of the measurement enables to determine the signal frequency, with respect to local oscillator (osc.) frequency determining the frequency of measurements. For Qdyne detection, the precision of frequency estimation may scale in accordance with $T^{-3/2}$.

ArrAs indicated above, the present technique may apply similar set of drive pulses, having generally known phase relations and temporal instances applied on the plurality of sensor units within the array 110, to thereby enable extraction of frequency and phase information from each of the sensor units 110 separately. Given the known phase and temporal relations between the drive pulses on the different sensor units, the present technique enables determining of complete wavefront information.

FIGS. 7A to 7D exemplify an experimental setup and high-resolution spectroscopy of magnetic fields for a sensor unit according to some embodiments of the invention.

Figure 7A:
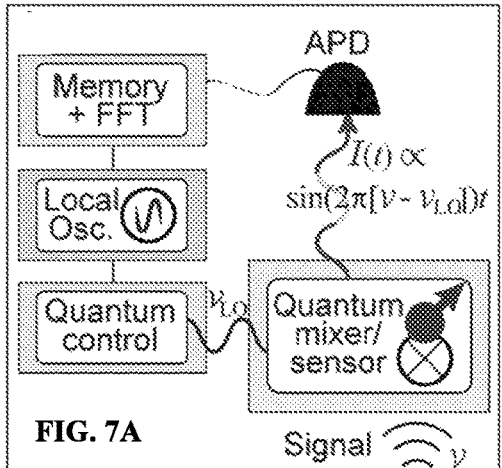
FIG. 7A to 7D exemplify sensor unit configuration and spectrum of collected signals according to some embodiments of the present invention.

FIG. 7A shows a schematic view of the measurement. The clock from a local oscillator is mixed with the signal frequency by the sensor unit (e.g. NV spin), and the intensity-modulated fluorescence is recorded.

Figure 7B:
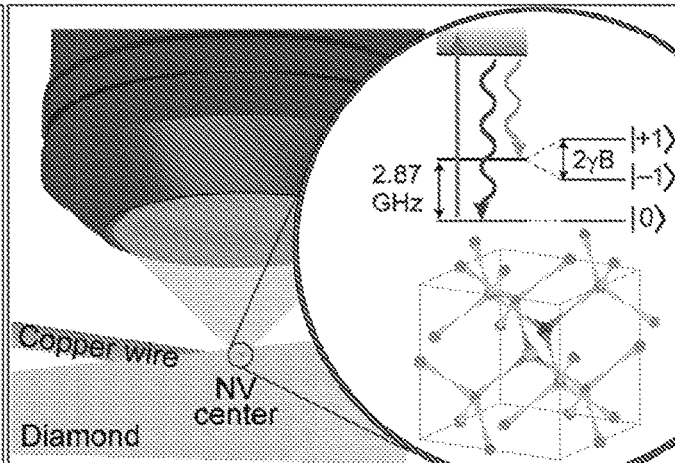

FIG. 7B illustrates an experimental setup using confocal microscopy of single NV center (~5 nm from the diamond surface) performed with 532-nm excitation. A copper wire is used for microwave and radio frequency control. Inset in FIG. 7B illustrates excitation of the NV center, which optically pumps the NV spin into the |0>spin state. The |0>state fluorescence is stronger than that of the |±1>states, allowing the NV spin to be read out optically.

Figure 7C:
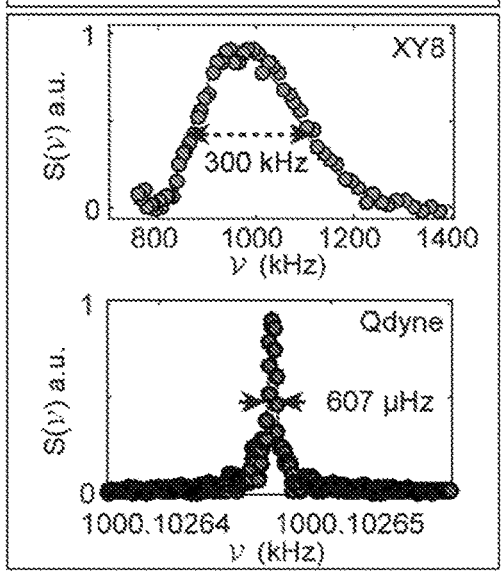

FIG. 7C shows spectroscopy of magnetic fields with a single NV center, top graph is a conventional XY8 magnetometry of a 1-MHz magnetic field, resulting in a linewidth of 300 kHz, bottom graph is Qdyne detection of the same magnetic field yielding a spectrum with a linewidth of 607 MHz, limited by the stability of a quartz crystal oscillator connected to the experiment as local oscillator.

Figure 7D:
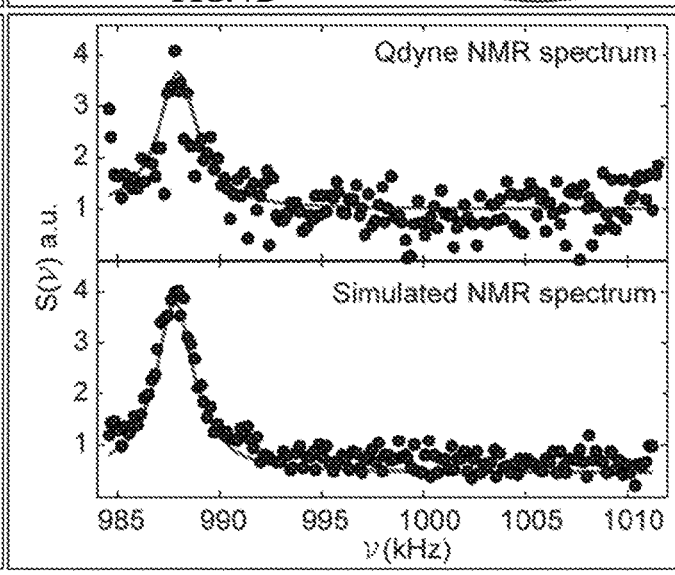

FIG. 7D shows Qdyne detection of proton Larmor frequency illustrating measured (top) and simulated (bottom) proton spectrum of polybutene using Qdyne.

FIGS. 8A to 8F exemplify performance of a sensor unit based on Qdyne operation of NV center, as compared to the conventional XY8 spectroscopy.

Figure 8A:
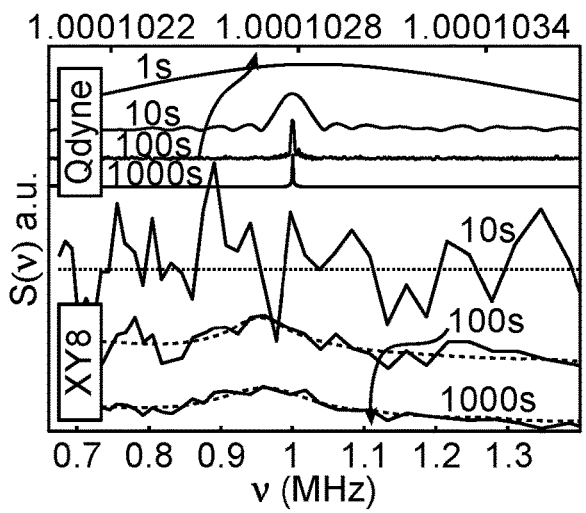
FIG. 8A to 8F show a comparison in spectral detection between the convention XY8 technique and technique according to some embodiments of the present invention.

FIG. 8A shows magnetic spectra recorded with the sensor unit (top, 1 s to 1000 s measurement times) and XY8 (bottom, 10 s to 1000 s measurement times) techniques. Lorentzian fits to XY8 data are shown as dotted lines.

Figure 8B:
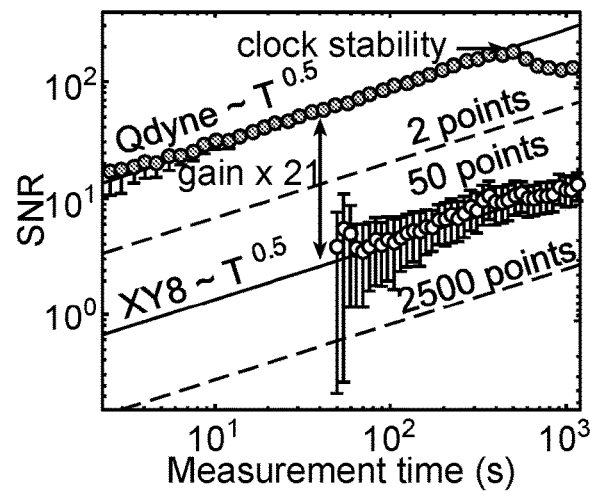

FIG. 8B shows Temporal scaling of SNR and magnetic field sensitivity of the sensor unit and XY8 magnetometry. Both techniques show photon shot-noise limited sensitivity, with SNR increasing as square root of T. At measurement times longer than the external clock stability of ~500 s, the SNR of sensor unit is reduced.

Figure 8C:
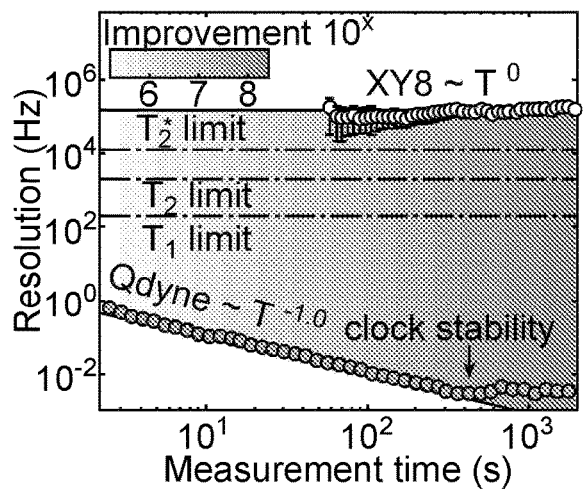

FIG. 8C shows spectral resolution of the sensor unit and XY8 techniques versus measurement time. The full width at half maximum (FWHM) of the signal measured with XY8 magnetometry is set by the interaction time and remains constant at 300 kHz for the measurement duration. The resolution of the sensor unit of the present technique improves linearly with measurement time, including overheads of sensor readout and preparation time, until the external clock stability is reached.

Figure 8D:
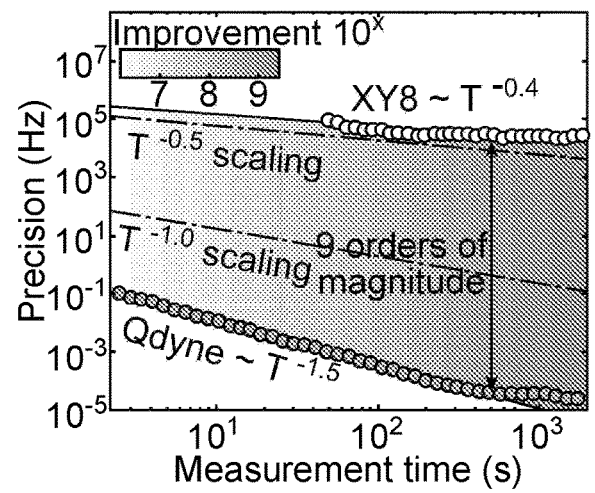

FIG. 8D shows precision of frequency estimation for the present technique and the XY8 technique as a function of measurement time, determined with least-squares fitting of the signal peak. While the precision of XY8 magnetometry improves near the standard quantum limit $T^{-1/2}$, as expected for independent measurements, the sensor unit of the present technique displays a precision improving as $T^{-3/2}$.

Figure 8E:
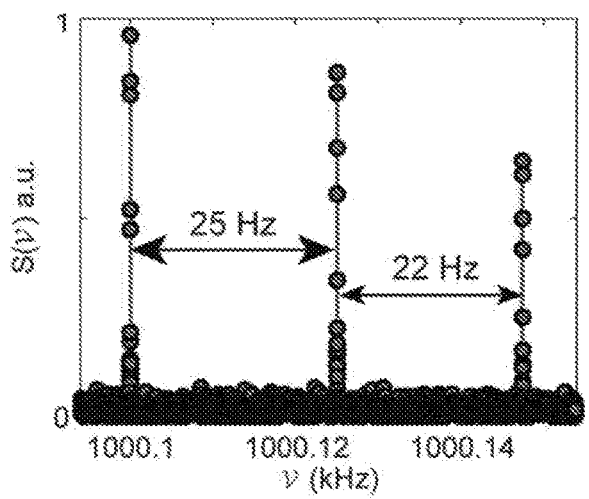

FIG. 8E shows Fourier transformed spectroscopy of multiple fields by using the present technique. Simultaneous detection of magnetic fields at three different frequencies (separated by 25 and 22 Hz) and generated by three independent signal generators.

Figure 8F:
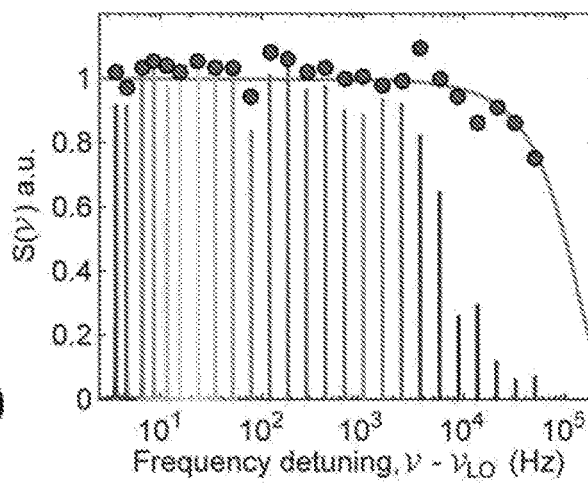

FIG. 8F exemplifies frequency bandwidth of sensor unit according to the present technique. The sensitivity to magnetic fields of different detuning is plotted for the different (discrete) detuning frequencies in comparison with the XY8-1 filter function shows as a line. Each spectrum is recorded for the same amount of time. The total integrated signal for each detuning is plotted with a circle.

This technique enables reconstruction of collected RF (e.g. microwave) signal, where the use of a plurality of sensor units arranged in an array 110, enables spatial as well as temporal reconstruction of the signal. The present technique utilizes predetermined relations of phase and timing of the drive and readout pulses applied to the array of sensor units 110 to allow determining phase and frequency of signal collected by the array in a way that is consistent between the sensor units.

The invention claimed is:

1. A sensor system comprising: a plurality of sensor units arranged in a predetermined arrangement to be exposed to an electromagnetic signal to be measured, a drive unit configured for providing one or more electromagnetic drive pulses to said sensing units to thereby affect one or more selected quantum properties associated with said plurality of sensor units, and an optical detector unit configured for detecting variation in one or more optical properties of the sensor units in response to input collected electromagnetic radiation; wherein said drive unit is configured to apply the electromagnetic drive pulses having a predetermined phase function on said plurality of sensor units,
  wherein said drive unit is configured for providing one or more sequences of the drive pulses onto said plurality of sensor units, path of said one or more sequences of the drive pulses being set to provide predetermine temporal relation between said drive pulses applied onto said plurality of sensor units, said one or more sequences of the drive pulses comprising the drive pulses separated by a selected time delay providing said sequence formed by two or more of the drive pulses within a coherence time of the sensor unit, said sequence of the drive pulses providing a sampling rate corresponding to at least twice expected frequency of the electromagnetic signal to be measured.

2. A phased array system comprising: an array of two or more sensor units arranged in a predetermined order, each of said sensor units comprising a solid state spin system having spin state dependent optical properties; a drive unit configured to provide at least one electromagnetic drive pulse onto said two or more sensor units, said electromagnetic drive pulse being configured to apply a predetermined phase function on said two or more sensor units; and an illumination unit configured to periodically provide an illumination pulse onto said two or more sensor units, said drive unit and said illumination unit being configured to coherently manipulate spin states of said two or more sensor units; and a detection unit comprising an arrangement of detector cells positioned and configured for collecting light output of said two or more sensor units and provide data indicative of spin state dependent optical properties of each of said two or more sensor units.

3. A sensor system comprising:
  (a) an array of two or more sensor units arranged in a predetermined order, each of said sensor units comprising a solid state spin system having spin state dependent optical properties;
  (b) a drive unit configured to provide at least one electromagnetic drive pulse onto said two or more sensor units; and an illumination unit configured to periodically provide an illumination pulse onto said two or more sensor units; said drive unit and said illumination unit being configured to coherently manipulate spin states of said two or more sensor units; wherein, said drive unit is configured to apply said electromagnetic drive pulse onto said two or more sensor units while having known phase function of said electromagnetic drive pulse reaching each of said two or more sensor units;
  (c) a detection unit comprising an arrangement of detector cells positioned and configured for collecting light output of said two or more sensor units and provide data indicative of spin state dependent optical properties of each of said two or more sensor units.

4. A sensor system comprising:
  a plurality of sensor units arranged in a predetermined arrangement to be exposed to an electromagnetic signal to be measured,
  a drive unit configured for providing one or more electromagnetic drive pulses to said sensing units to thereby affect one or more selected quantum properties associated with said plurality of sensor units,
  an optical detector unit configured for detecting variation in one or more optical properties of the sensor units in response to input collected electromagnetic radiation, and
  an illumination unit configured to periodically apply illumination pulse onto two or more sensor units to cause light responses of the sensing units,
  wherein said drive unit is configured to apply the electromagnetic drive pulses having a predetermined phase function on said plurality of sensor units, said drive unit and said illumination unit being configured and operable to coherently manipulate the spin states of said two or more sensor units, the optical detector unit comprising an arrangement of detector cell positioned and configured for collecting the light response of said two or more sensor units and provide data indicative of spin state dependent optical properties of each of said two or more sensor units.

5. The system of claim 1, wherein said plurality of the sensor units comprises a plurality of color centers of one or more crystal structures.

6. The sensor system of claim 1, wherein said drive unit comprises at least a first electromagnetic drive source configured to periodically provide first electromagnetic drive pulse of a first frequency range applied onto said plurality of sensor units.

7. The system of claim 1, wherein said drive unit is configured to provide the at least one electromagnetic drive pulse having uniform phase and pulse time at positions of said plurality of sensor units.

8. The system of claim 1, wherein said drive unit is configured to provide the at least one electromagnetic drive pulse having linear phase variation at positions of said plurality of sensor units.

9. The system of claim 1 wherein the plurality of the sensor units comprises an array of two or more sensor units arranged in a predetermined order, each of said sensor units comprising solid state spin system having spin state dependent optical properties.

10. The system of claim 1, comprising an illumination unit configured to periodically apply illumination pulse onto two or more sensor units to cause light responses of the sensing units, said drive unit and said illumination unit being configured and operable to coherently manipulate the spin states of said two or more sensor units, the optical detector unit comprising an arrangement of detector cell positioned and configured for collecting the light response of said two or more sensor units and provide data indicative of spin state dependent optical properties of each of said two or more sensor units.

11. The phased array system of claim 2, wherein said drive unit is configured to apply said electromagnetic drive pulse onto said two or more sensor units while having known phase function of said electromagnetic drive pulse reaching each of said two or more sensor units.

12. The system of claim 4, wherein said drive unit is characterized by at least one of the following:
  (1) onto said two or more sensor units while having a known phase function of said electromagnetic drive pulse reaching each of said two or more sensor units;

(2) said drive unit is configured to provide said at least one electromagnetic drive pulse having uniform phase in locations of said two or more sensor units;

(3) said drive unit is configured to provide one or more sequences of the drive pulses within a coherence time of the plurality of sensor units, said sequence of the drive pulses providing a phase sampling enabling detection of phase and frequency data of the signal being measured; and (4) said drive unit is configured for providing one or more sequences of the drive pulses onto said plurality of sensor units, path of said one or more sequences of the drive pulses being set to provide predetermine temporal relation between said drive pulses applied onto said plurality of sensor units.

13. The system of claim 4, wherein said drive unit is configured for providing one or more sequences of the drive pulses onto said plurality of sensor units, path of said one or more sequences of the drive pulses being set to provide predetermine temporal relation between said drive pulses applied onto said plurality of sensor units, said one or more sequences of the drive pulses comprising the drive pulses separated by a selected time delay providing said sequence formed by two or more of the drive pulses within a coherence time of the sensor unit.

14. The system of claim 13, wherein said sequence of the drive pulses provides a sampling rate corresponding to at least twice expected frequency of the electromagnetic signal to be measured.

15. The system of claim 5, wherein said color canters comprise one or more of the following: nitrogen vacancy (NV), silicon vacancies, Di vacancies, oxygen vacancies.

16. The system of claim 5, wherein said crystal structure comprises crystals selected from the following: diamond, silicon, silicon carbide, carbides, metal oxides rare-earth crystals.

17. The sensor system of claim 6, wherein said drive unit further comprises a second electromagnetic drive source configured to periodically provide a second electromagnetic drive pulse of a second frequency range applied onto said plurality of sensor units.

18. The system of claim 10, wherein said drive unit is configured to apply said electromagnetic drive pulse onto said two or more sensor units while having a known phase function of said electromagnetic drive pulse reaching each of said two or more sensor units.

19. The system of claim 10, wherein said drive unit is configured to provide said at least one electromagnetic drive pulse having uniform phase in locations of said two or more sensor units.

20. The system of claim 10, wherein said drive unit is configured to provide one or more sequences of the drive pulses within a coherence time of the plurality of sensor units, said sequence of the drive pulses providing a phase sampling enabling detection of phase and frequency data of the signal being measured.

* * * * *